July 12, 1949.　　　　　　H. R. BIERMAN　　　　　　2,475,588
DECELERATION HARNESS COMPRISING UNDRAWN
SYNTHETIC FIBERS OR THE LIKE
Filed Feb. 28, 1946　　　　　　　　　　　　　　　2 Sheets-Sheet 1

Inventor
HOWARD R. BIERMAN
By M. A. Hayes
Attorney

July 12, 1949.

H. R. BIERMAN 2,475,588

DECELERATION HARNESS COMPRISING UNDRAWN SYNTHETIC FIBERS OR THE LIKE

Filed Feb. 28, 1946

Inventor
HOWARD R. BIERMAN

By M. O. Hayes

Attorney

Patented July 12, 1949

2,475,588

UNITED STATES PATENT OFFICE 2,475,588

DECELERATION HARNESS COMPRISING UNDRAWN SYNTHETIC FIBERS OR THE LIKE

Howard R. Bierman, United States Navy

Application February 28, 1946, Serial No. 651,020

7 Claims. (Cl. 244—122)

(Granted under the act of March 3, 1883, as amended April 30, 1928; 370 O. G. 757)

This invention relates to an energy absorber and has for an object to provide an energy absorbing material and products made from this energy absorbing material.

Another object of this invention is to provide an energy absorbing material which may be made into numerous energy absorbing products capable of numerous applications for absorbing unwanted or undesirable energy.

A further object of this invention is to provide an energy absorbing device particularly useful in preventing injury or loss of life in connection with extremely rapid changes in acceleration or deceleration anywhere as in gunmount seats, firemen's life nets and in vehicles such as automobiles, aircraft, etc. When used on the gunmount seat, it prevents the observer from being catapulted therefrom in the case of a nearby bomb or shell explosion. It is particularly useful in cases of extreme deceleration, as when a vehicle crashes into the ground or into another vehicle in preventing injury or loss of life to the occupant of the crashed vehicle. It is likewise capable of and intended for use in cases of extreme rapid acceleration to permit live bodies to be safely carried by vehicles whose rate of acceleration is normally too great to permit life to exist safely therein. Rocket, jet and explosive-propelled objects whose rate of acceleration is too great to enable live bodies to be carried thereby at present may with this invention become safe carriers of live beings.

Still a further object of this invention is to provide an energy absorber which may be made into various life-protecting products, such as safety or crash belts, for use on vehicles including both aircraft and land or sea craft. A parachute harness may likewise have this energy absorber included as part of the riser straps therein, thus enabling the canopy to be made of a material strong enough to be utilized at any rate of speed without risk of injury to the wearer. When a wearer of a conventional type of parachute bails out of present day high-speed aircraft, some of which have already exceeded 500 miles per hour, he must wait a considerable period until air resistance has slowed him down sufficiently before he may safely open his parachute; otherwise his canopy would rip to pieces; or if his canopy were strong enough, his harness would injure or crush him due to the sudden shock imparted by the opening of the canopy at the high speed that the aircraft was traveling. Obviously, under such circumstances, the parachute is of no value as a safety device at any altitude too low to enable the wearer to slow down before opening the parachute. With this invention, however, the parachute canopy may be made strong enough that it may be opened instantly upon leaving the aircraft, irrespective of its speed or altitude without danger or injury to the wearer, thus making it possible to bail out in emergencies at a high speed and low altitude with safety.

Still another object of this invention is to provide an energy absorber capable of being made into any other products wherein absorption of energy is desirable. One such product, for instance, is a tow rope for use between vehicles, particularly between aircraft wherein one powered aircraft is used to hook onto and pick up a glider aircraft from a standstill on the ground to flying speed in the air. A tow rope made of conventional material would break under circumstances where the present tow rope could be used to make a safe pickup and, in addition, should unexpected and excessive strains be placed on the tow rope, such strains would be absorbed by a tow rope made according to the present invention under circumstances where a tow rope made of conventional material would most certainly break. An example of such would be if a sudden unexpected storm were encountered while in flight.

Still another object of this invention is to provide an energy absorber wherein the energy absorption takes place in the material itself and wherein the material itself actually becomes stronger after the energy has been absorbed than it was before; that is, the elastic limit of the energy absorbing material is greater after it has been utilized to absorb the energy than the elastic limit was before the energy was absorbed.

A further object of this invention is to utilize materials made wholly or partially of synthetic fibers wherein the synthetic fibers are utilized in an incompleted step of manufacture. Among the synthetic fibers utilized in this invention are those of the types commonly referred to as nylon, although not limited to such, and disclosed in more detail in U. S. Patent No. 2,130,948 and in the patents and literature referred to in such patent, although not limited to such. As disclosed on page 5, column 1, lines 62–70 of this patent, the synthetic filaments are subjected to a cold drawing process elongating them as much as 200 to 700%, which elongation is accompanied by a progressive increase in tensile strength. This takes place before the filaments are made into fibers. In the present invention the filaments are not subjected to this cold drawing process, but instead are made up into fibers and then into energy absorbing products without undergoing this elongation or stretching process. However, the filaments and the fibers thus prepared therefrom are still capable of being elongated and of acquiring a progressive increase in tensile strength while being elongated and it is this property of the filaments and the fibers that provides the energy absorption in the products made according to this invention. Thus it is an object of this invention to utilize this elongation property and tensile strength increasing property under elongation of the synthetic filaments and fibers to provide energy absorption in the products made therefrom.

With the foregoing and other objects in view, this invention consists in the construction, combination and arrangement of parts hereinafter set forth, claimed and illustrated in the drawings in which:

In making ordinary synthetic fibers and materials therefrom including those synthetic fibers, known among other names as nylon, some of which are made according to disclosures set forth in U. S. Patent No. 2,130,948 above mentioned including the literature and patents therein referred to, it is a common step in the production of the fiber to elongate or stretch the filament before it is made into fiber, this step being disclosed in the aforementioned patent on page 5, column 1, lines 62–70. Up to this step the manufacture of the shock absorber of this invention may proceed as described in this patent. Beyond this step the manufacture of the material may likewise proceed as so described; but this elongating or stretching step must be either entirely omitted or at least partly or substantially omitted. However, the fabric or product made of this material with this step partly or completely omitted is still inherently capable of undergoing this elongation or stretching and of simultaneously increasing in tensile strength while thus undergoing this elongation or stretching. When undergoing this elongation or stretching the material absorbs energy, and it is this absorption of energy by the material of the completed product that enables and causes the completed product to act as an energy absorber in any of the various products into which it may be made.

Figure 4:
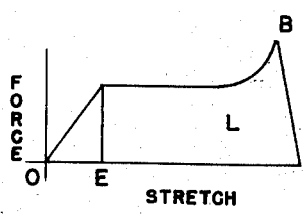
Fig. 4 is a diagram showing the relation between the force and the stretch or elongation of the material.

The term "unstretched material" or "unstretched fabric" as herein used, means that the fabric or material is made of fibers whose filaments have either never been elongated or stretched at all or at most have only been partly elongated or stretched and are still capable of further elongation or stretching before reaching the elastic limit beyond which they approach the breaking limit, as diagrammatically shown in Fig. 4 wherein the applied force is shown vertically and the resultant elongation is shown horizontally.

As the force is applied, the material yields elastically from the point O to the point E. At any point between O and E the material will return to its original condition when the force is released. When a sufficient force is applied to carry it beyond the point E, then the material begins to elongate or stretch and absorb energy. This continues uniformly until it reaches the point L at which the curve rises from a new and final elastic limit towards the breaking limit at B, at which point the material breaks and fails. Between points E and L there is absorption of energy, which energy is not returned as it is between the points O and E or between the points L and B. Between the points O and E the material acts just as any other material acts within its elastic limit of yielding under stress and returning substantially to its original condition. Beyond this point, the material yields, absorbing energy without transmitting any additional energy until it has reached the point L, whereupon it cannot absorb any more energy, but instead starts to yield from its new elastic limit toward its breaking point. However, at the point L it is capable of taking much more strain before breaking than it could at the point O before reaching the elastic limit E. Obviously, by appropriate selection of material, particularly as to the condition of the filaments or as to the number and size of fibers from which the fabric is woven, the points E, L and B may be varied within a wide discretion according to the use to which it is to be put. One of these uses is shown in Figs. 1 and 2 wherein a fabric is made which includes unstretched synthetic fibers, as above set forth.

Figure 10:
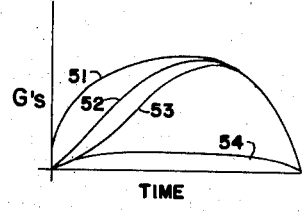
Figure 10 is a diagram showing the acceleration-time curves under normal conditions and under conditions employing the novel deceleration harness of the present invention.

Two important features of the use of this invention is that it decreases the rate of increase of acceleration and that it decreases the total peak acceleration under any given circumstance. As brought out in the diagram in Fig. 10, curve 51 plotted between acceleration of gravity or $g$ and time, shows the normal high rate of increase of acceleration present under certain circumstances, while curve 52 shows the average rate of increase of acceleration for the same circumstances. Curve 53 shows the optimum rate of increase of acceleration when the same peak of acceleration is finally attained. By utilizing the energy absorber of this invention, the rate of increase of acceleration and the peak of acceleration are shown by curve 54 wherein the acceleration increases much more slowly, less than in any of the other curves and the peak of acceleration is considerably below the peak of acceleration obtained in any of the other curves. An individual exposed to the conditions shown by 51 and 52 would probably be killed or severely injured. Under the conditions shown in curve 53 he might escape death, but would probably still have some degree of injury, very likely crippling; while under the conditions of curve 54, no injury would result at all.

Figure 1:
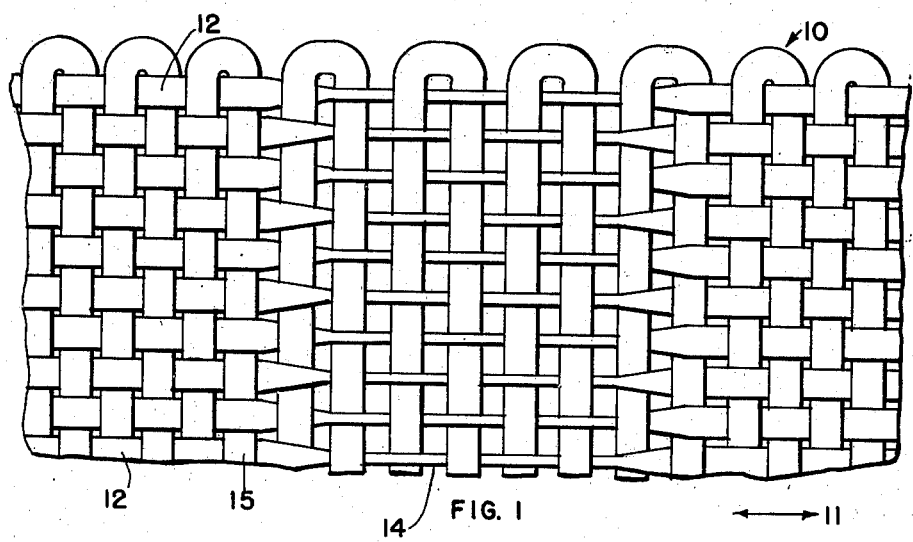
Fig. 1 is an enlarged fragmentary view of a piece of fabric webbing made according to this invention which has been subjected to strain in one direction only.

In Fig. 1, the fabric 10 has been subjected to a force beyond its elastic limit E, longitudinally in the direction of the arrow 11, but not beyond the new elastic limit L. As a result the longitudinal fibers 12 have been partially stretched as shown at 14. However, inasmuch as the tensile strength of the fibers at 14 is now greater than that at 12, the succeeding portions of the longitudinal fibers 12 will stretch progressively, thus absorbing more and more energy as necessary, without breaking, until the entire amount of fiber susceptible to stretching has been completely stretched. By merely incorporating sufficiently long fibers or a sufficient amount of material, the distance between the points E and L on the curve of Fig. 4 may be controlled, as desired. Inasmuch as the material in Fig. 1 is being subjected to a force only longitudinally, the lateral fibers 15 are substantially unaffected and may be made of any other material.

Figure 2:
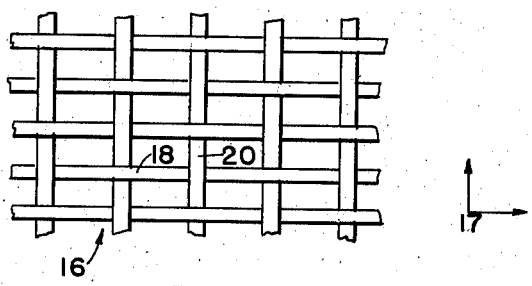
Fig. 2 is a similar fragmentary view of a section of fabric which has been subjected to stresses in more than one direction simultaneously.

In Fig. 2, however, there is shown a piece of material 16, originally having unstretched fibers in both directions, which has been subjected to a force whose components are at right angles to each other as shown at 17, thus causing the fibers to be stretched longitudinally as at 18 and transversely as at 20.

Figure 3:
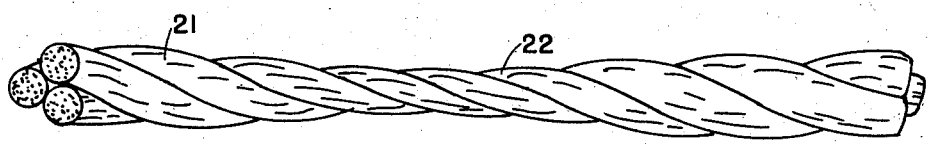
Fig. 3 is an elevational view of a section of tow rope which has already been utilized as an energy absorber.

In Fig. 3, there is shown a cable or tow rope 21 which has been subjected to force beyond its elastic limit E, causing an elongation or stretching of a portion thereof as at 22. As a force beyond the elastic limit E continues to be applied to the cable 21, the stretching or elongation will extend progressively along both sides of the portion 22, it being apparent that the point L can never be reached until the entire cable has been stretched to the condition at 22. By making the cable 21 of sufficient length practically any amount of energy could be absorbed thereby, for the stretched cable portion at 22 is of greater tensile strength and more elastic than the unstretched portion at 21. In these illustrations it is assumed that the force has been localized for some reason or other; but if the force is uniformly applied over the entire material, it is obvious that stretching will take place uniformly over the entire material; but it is equally obvious that the same result will follow, that the point L will not be reached until all of the material capable of being stretched has been stretched to the point L before any of the material goes beyond the point L toward the breaking limit B.

Figure 6:
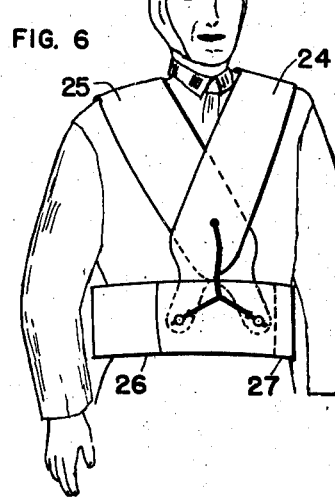
Fig. 6 is a front view showing how the body safety belt is secured about the wearer.
Figure 5:
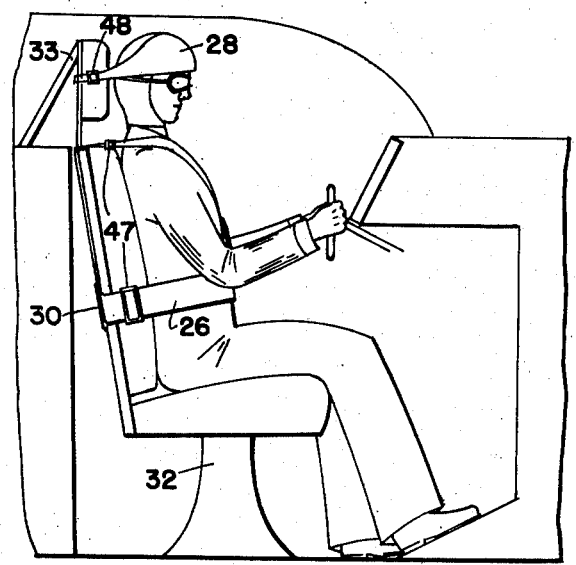
Fig. 5 is an elevational view of a pilot in the cockpit of an airplane wearing a body safety belt and head safety belt made according to this invention.
Figure 7:
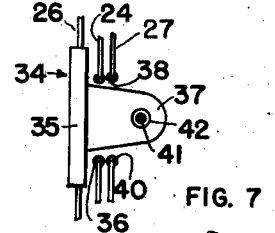
Fig. 7 is a detailed view of a quick-release fastening in the safety belt of Figs. 5 and 6.

In Figs. 5, 6 and 7 the invention is shown as applied to a decelerating harness. This decelerating harness is to be used where large impact forces are expected, such as occurs during aircraft crashes. The decelerating harness is designed to act during the time the greatest peak forces during the impact are occurring. The decelerating harness consists of shoulder straps 24 and 25 and a pair of seat belt straps 26 and 27 and may also include a head decelerating strap 28. Each of these straps 25 to 28 inclusive is securely fastened to any part that is rigidly attached to the aircraft, such as a rigid back 31 of a seat 32 or an upright stanchion 33 securely fastened to the aircraft. Alternatively the shoulder straps 24 and 25 may be integrally extending ends of the same piece passing behind the seat support 31 and similarly the belt straps 26 and 27 may be integrally extending ends extending behind the firm seat back 31, being held against loss by suitable loops on the seat back. As shown, the head decelerating strap 28 is so shaped that it may be easily dropped over the helmet just above eye level so that in case of crash, any tendency of the head to either pivot about the neckline or to travel forward causes the head to more firmly seat itself in the strap 28 and serve to decelerate the head at such a rate that it will keep the head in comfortable relation to the body, thereby preventing any possibility of injury to the head or neck of the wearer.

The body harness consisting of the shoulder straps and belt straps is assembled with a quick-disconnect mechanism as at 34, enabling the wearer to get out of the same very quickly after a crash in case a fire should occur, or if the crash is in water, in case the disabled aircraft is about to sink.

The details of one form of quick-disconnect mechanism are shown in Fig. 7 wherein a pair of base members 35 are securely fastened to one of the belt straps 26, for instance. The other belt strap 25 overlaps the strap 24 and is provided with a pair of grommetted openings 36 adapted to fit over cones 37 extending from the bases 35. Each shoulder strap 24 and 25 is similarly provided with single grommetted openings 38. Pins 41 inserted through the openings 42 in cones 37 hold the overlapped strap on the cones 37 and prevent accidental removal until the pins are intentionally withdrawn, allowing the straps to separate and release the wearer instantly. To insure the pins 41 remaining in position until they are intentionally released, the other end of the pins are joined to a common cable 40, whose end is secured against loss to one of the shoulder straps 24. When the wearer desires to release himself quickly, he has but to grab with one hand at the cable 40, withdrawing the pins 41 from the cones 37, whereupon the wearer will be immediately released from connection with the decelerating harness. To release himself from the head strap 28, he need but bend his head slightly backward and throw it off with his other hand, thus enabling a quick and instantaneous escape from the decelerating harness to be easily made.

The harness and head strap will be all made of the energy absorbing material as above described. To insure proper deceleration, the harness and straps will be shaped and sized to fit the front of the wearer and, in addition, may have some fibers of different known tensile strength and stretch than other fibers to allow for different amounts of stretch in different parts of the harness.

In one form, the shoulder straps 24 and 25 are three inches wide with a slightly narrower cut-out at the shoulder and neck area for comfort and to allow more freedom of movement. The straps 24 and 25 become wider over the pectoral area and then narrow as they cross each other to secure to the quick-release mechanism 34. The straps are so constructed that the widest possible area of the straps will accept the force of the impact and transmit it to the largest surface of the body of the wearer.

The seat belt straps 26 and 27 are three inches wide at their lateral attachments 30 and widen as they approach the median line of the body. They have a concave smooth surface adjacent the quick-release mechanism 34 to fit the convex groove made by the sitting body at the level of the iliac spines. The quick-release mechanism 34 is placed in the mid line as conventional, while as above described, the bases 35 of the quick-detaching mechanism are secured to the belt strap 26. They may, of course, be equally well attached to the shoulder straps.

Both the seat and shoulder straps can withstand a 10,000-pound impact force which is far above the force that can be absorbed by a human being. The energy absorbing material is made of fibers of known tensile strength and stretch. Interwoven into this material may be incorporated other fibers of a different known strength and stretch to allow for different amounts of stretch for different parts of the body. Over the pectoral area where the strap is the widest, the center portion of the strap stretches more than at the edges so that under decelerative forces, the body in contact with the center of the strap moves forward along this area until the surface contacting the edges of the strap will cause it to stretch. This makes the strap form-fitting and allows the entire area of the material to support the body as it moves forward, as under the impetus of a crash or sudden excessive deceleration. The same applies to the seat belt. As thus described, the harness operates as does an ordinary safety belt during an ordinary landing; that is, it yields under the decelerating force of an ordinary landing somewhere between the points O and E on the diagram of Fig. 4. Should the landing turn into a crash, then the belt will stretch beyond the point E towards the point L, absorbing the energy of the crash and preventing injury to the wearer.

By test, it has been determined that a 10,000-pound impact force at the attachment points 30, which, of course, is beyond the tolerance of the human body to absorb with safety, will be reduced by the energy absorbing properties of this material of which the harness is made to a 1,200-pound impact force or less, which is well within the tolerance of the average human being. If desired, the initial impact force that may be absorbed may be more than 10,000-pound impact force while the final force transmitted to the body may be less than 1,200-pound force as measured in the test, by merely increasing the number of fibers and hence the amount of material present in the harness. The strap material can be woven for any predetermined value of stretch or strength; to allow the stretch to come into play at a given force; to possess no recoil; and to vary in strength at any points to accommodate the moving body.

Suitable adjusting buckles may be provided in the straps in a conventional manner so that a single tug of the adjusting strap will suffice to procure a snug and tight fit, conventional adjusting rings being shown at 47 and 48. By properly adjusting the straps, equal distribution of weight to the shoulder straps and the seat belt straps is provided at any angle at which the plane might strike a denser media.

Figure 8:
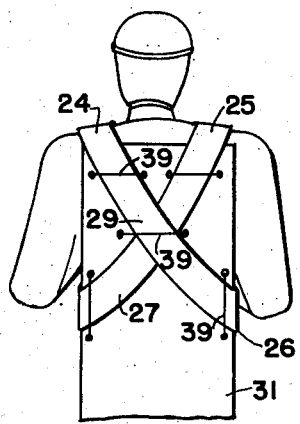
Fig. 8 is a back view of a modified harness wherein the shoulder and belt straps are integrally connected.

In Fig. 8 the shoulder straps 24 and 25 and belt straps 26 and 27 are shown as integrally connected; that is, belt strap 26 is an integral extension of shoulder strap 24 as is belt strap 27 an integral connection of shoulder strap 25. In this form the straps cross each other as at 29 behind the wearer and behind the seat back 31 and extend loosely through a plurality of loops 39 secured to the back of the seat 31. The front construction of this form would be identical with that shown in Fig. 6 and it is apparent that the forces will be more evenly distributed over the seat back than in the concentrated small areas as in the form of Fig. 5.

Figure 9:
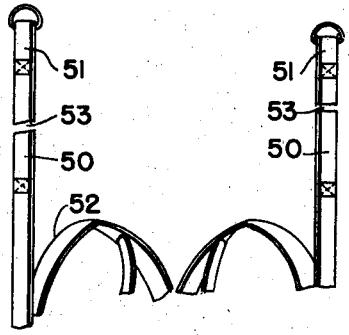
Fig. 9 is a fragmentary elevational view of a parachute harness in the risers of which this invention has been incorporated.

In Fig. 9 the energy absorber of this invention is shown as applied at 50 in the riser straps 51 of a parachute harness fragmentarily shown at 52. The energy absorbing portions 50 may be of any desired length within the limits of the length of the risers 51, as diagrammatically shown by the breaks 53. In this form it is possible that the energy absorber fibers 12 may extend only longitudinally in the direction of the risers 51, while the lateral fibers 15 hereof, not being subject to any stretch, may be made of conventional pre-stretched fibers, as in the conventional synthetic fibers already on the market according to the above-mentioned patent. When the risers 51 include the energy absorber portions 50 as herein described, the canopy will of course have to be made of sufficient strength to withstand the decelerative forces which it may have to undergo in opening at excessively high speeds. As is well known, the speed of a falling human body of average size is about 120 miles per hour due to air resistance and present-day parachute canopies are usually made with this in mind; that is, if the pilot bails out of his plane at a higher speed, he is supposed to wait until air resistance has slowed him down to this speed before opening his parachute, for the shock of opening a parachute at any speed greatly in excess of this would be more than his body could bear even though the canopy were made stronger. With the energy absorber risers of this invention, however, the shock transmitted to the body is within the tolerance limits of the body irrespective of the speed at which the body is falling at the time the parachute opens. Hence, the parachute canopy must be made sufficiently strong to take the shock. If necessary, some parts of the canopy may be made of unstretched fibers according to this invention to enable it to absorb the shock of opening at excessively high speeds. For instance, some panels could be partly of this material, some entirely of this material, and some entirely of conventional material, but possibly of thicker weave than conventional so that it may withstand the shock.

Although particular applications of the energy absorber of this invention have been described in connection with aircraft safety devices, it will be understood that the invention is not limited. It is equally applicable as a safety and energy absorbing device in nets, seats as on gunmounts or elsewhere or in other types of vehicles, such as automobiles, either for every day use or for racing or testing use, such as power boats and even for providing means enabling human beings to travel in explosive or rocket propelled vehicles with their sudden acceleration and sudden deceleration.

Other modifications and changes in the number and arrangement of the parts may be made by those skilled in the art without departing from the nature of this invention, within the scope of what is hereinafter claimed.

The invention herein described and claimed may be manufactured and used by or for the Government of the United States of America for governmental purposes without the payment of any royalties thereon or therefor.

What is claimed is:

1. A deceleration harness for use in crashes or the like wherein deceleration is ordinarily non-uniform and exceeds the injury threshold during only a small fraction of the total deceleration period, said harness comprising shoulder straps and waist straps interconnected about the body of a wearer by a quick-disconnect mechanism at one end, the other ends of the straps being adapted to be securely anchored to substantially nonyielding foundations, said straps being made at least partially of undrawn nylon fibers capable of energy absorption by inelastic elongation of at least 200% extending in the direction that the stresses will occur in use, said straps being constructed and arranged more or less permanently to elongate during said small fraction thereby to maintain maximum deceleration below the injury threshold.

2. A deceleration harness for use in crashes or the like wherein deceleration is ordinarily non-uniform and exceeds the injury threshold during only a small fraction of the total deceleration period, said harness comprising a pair of shoulder and belt straps extending back of a firm support and interconnected about the front of the body of a wearer by a quick-disconnect mechanism, said straps being made at least partially of undrawn nylon fibers capable of energy absorption by inelastic elongation of at least 200% extending in the direction that the stresses will occur in use, said straps being constructed and arranged more or less permanently to elongate during said small fraction thereby to maintain maximum deceleration below the injury threshold.

3. A deceleration harness for use in crashes or the like wherein deceleration is ordinarily non-uniform and exceeds the injury threshold during only a small fraction of the total deceleration period, said harness comprising a pair of shoulder and belt straps criss-crossed back of a firm support and interconnected about the front of the body of a wearer by a quick-disconnect mechanism, said straps being made at least partially of undrawn nylon fibers capable of energy absorption by inelastic elongation of at least 200% extending in the direction that the stresses will occur in use, said straps being constructed and arranged more or less permanently to elongate during said small fraction thereby to maintain maximum deceleration below the injury threshold.

4. For use in protecting a human being against injury from excessively rapid acceleration or deceleration, a harness adapted to encircle and support the body, and a flexible connecting element extending from said harness and constructed and arranged for connection to a member capable of non-uniform change in velocity wherein the rate of change exceeds the injury threshold during only a small fraction of the total change period, said connecting element being constructed at least in part of undrawn nylon capable of energy absorption by inelastic elongation of at least 200% and being constructed and arranged more or less permanently to elongate during said small fraction thereby to maintain maximum rate of change below the injury threshold.

5. A deceleration harness for use in protecting a human being against injury from excessively rapid deceleration comprising a body supporting portion and at least one flexible connecting element extending from said body portion and constructed and arranged for quick attachable and detachable connection to a member capable of non-uniform deceleration wherein deceleration exceeds the injury threshold during only a small fraction of the total deceleration period, said connecting element being constructed at least in part of undrawn nylon capable of energy absorption by inelastic elongation of at least 200%, and being constructed and arranged more or less permanently to elongate during said small fraction thereby to maintain maximum deceleration below the injury threshold.

6. For use in protecting a human being against injury from excessively rapid acceleration or deceleration, a harness adapted to encircle and support the body, and a flexible connecting element extending from said harness and constructed and arranged for connection to a member capable of non-uniform rate of change of velocity wherein said rate of change exceeds the injury threshold during only a small fraction of the total period, said connecting element being constructed at least in part of undrawn synthetic fibers extending in the direction of stress and capable of energy absorption by inelastic elongation of at least 200%, and being constructed and arranged more or less permanently to elongate during said small fraction thereby to maintain maximum deceleration below the injury threshold.

7. A deceleration harness for use in protecting a human being against injury from excessively rapid deceleration comprising a body supporting portion and at least one flexible connecting element extending from said body portion and constructed and arranged for quick attachable and detachable connection to a member capable of non-uniform deceleration wherein said deceleration exceeds the injury threshold during only a small fraction of the total period, said connecting element being constructed at least in part of undrawn synthetic fibers extending in the direction of stress and capable of energy absorption by inelastic elongation of at least 200%, and being constructed and arranged more or less permanently to elongate during said small fraction thereby to maintain maximum deceleration below the injury threshold.

HOWARD R. BIERMAN.

REFERENCES CITED

The following references are of record in the file of this patent:

UNITED STATES PATENTS

| Number | Name | Date |
| --- | --- | --- |
| 761,806 | Woodhouse | June 7, 1904 |
| 1,418,783 | Fokker | June 6, 1922 |
| 2,112,614 | Wiley | Mar. 29, 1938 |
| 2,130,948 | Carothers | Sept. 20, 1938 |
| 2,192,109 | Smith | Feb. 27, 1940 |
| 2,197,896 | Miles | Apr. 23, 1940 |
| 2,343,892 | Dodge | Mar. 14, 1944 |
| 2,389,132 | Borgett | Nov. 20, 1945 |
| 2,401,748 | Dillon | June 11, 1946 |
| 2,407,634 | Du Pont | Sept. 17, 1946 |

FOREIGN PATENTS

| Number | Country | Date |
| --- | --- | --- |
| 128,049 | Great Britain | June 19, 1919 |
| 549,953 | Great Britain | Dec. 15, 1942 |

Disclaimer 2,475,588.—*Howard R. Bierman*, U. S. Navy. DECELERATION HARNESS COMPRISING UNDRAWN SYNTHETIC FIBERS OR THE LIKE. Patent dated July 12, 1949. Disclaimer filed Sept. 22, 1950, by the inventor.
Hereby enters this disclaimer to claims 4 and 6 of said patent.
*Official Gazette October 17, 1950.*